United States Patent [19]
Waters

[11] 3,846,026
[45] Nov. 5, 1974

[54] ROTATING BEAM SURVEYING METHOD AND APPARATUS

[75] Inventor: Kenneth H. Waters, Ponca City, Okla.

[73] Assignee: Continental Oil Company, Ponca City, Okla.

[22] Filed: Nov. 1, 1971

[21] Appl. No.: 194,397

[52] U.S. Cl................... 356/152, 356/4, 356/5, 356/152, 356/141, 356/172, 350/7
[51] Int. Cl................... G01b 11/26, G01c 3/08
[58] Field of Search.......... 356/4, 5, 141, 152, 172; 350/7; 340/27 NA, 29; 33/293; 172/4.5

[56] References Cited
UNITED STATES PATENTS

| | | | |
|---|---|---|---|
| 3,687,556 | 8/1972 | Price et al. | 356/141 |
| 3,680,958 | 8/1972 | Von Bose | 356/4 |
| 3,602,572 | 8/1971 | Norris, Jr. | 350/7 |
| 3,447,129 | 5/1969 | Birmingham et al. | 340/29 |
| 3,588,255 | 6/1971 | Alexander | 356/172 |
| 3,588,249 | 6/1971 | Studebaker | 356/4 |
| 3,400,398 | 9/1968 | Lapeyre et al. | 343/106 R |

Primary Examiner—Benjamin A. Borchelt
Assistant Examiner—S. C. Buczinski
Attorney, Agent, or Firm—Joseph C. Kotarski et al.

[57] ABSTRACT

An improved surveying method and apparatus for determining various parameters such as, for example, the azimuth, the elevation, and the distance of a receiver location with respect to a projector location, having a beam projector located at the projector location transmitting projected energy beams and a beam receiver located at the receiver position for intercepting the projected energy beams over a predetermined range of diverted angular positions thereof, the beam projector and the beam receiver each having cooperating control apparatus for identifying the arrival time of each intercepted, projected energy beam and for identifying the position of each intercepted, projected energy beam in a vertical datum plane and in a horizontal datum plane.

19 Claims, 11 Drawing Figures

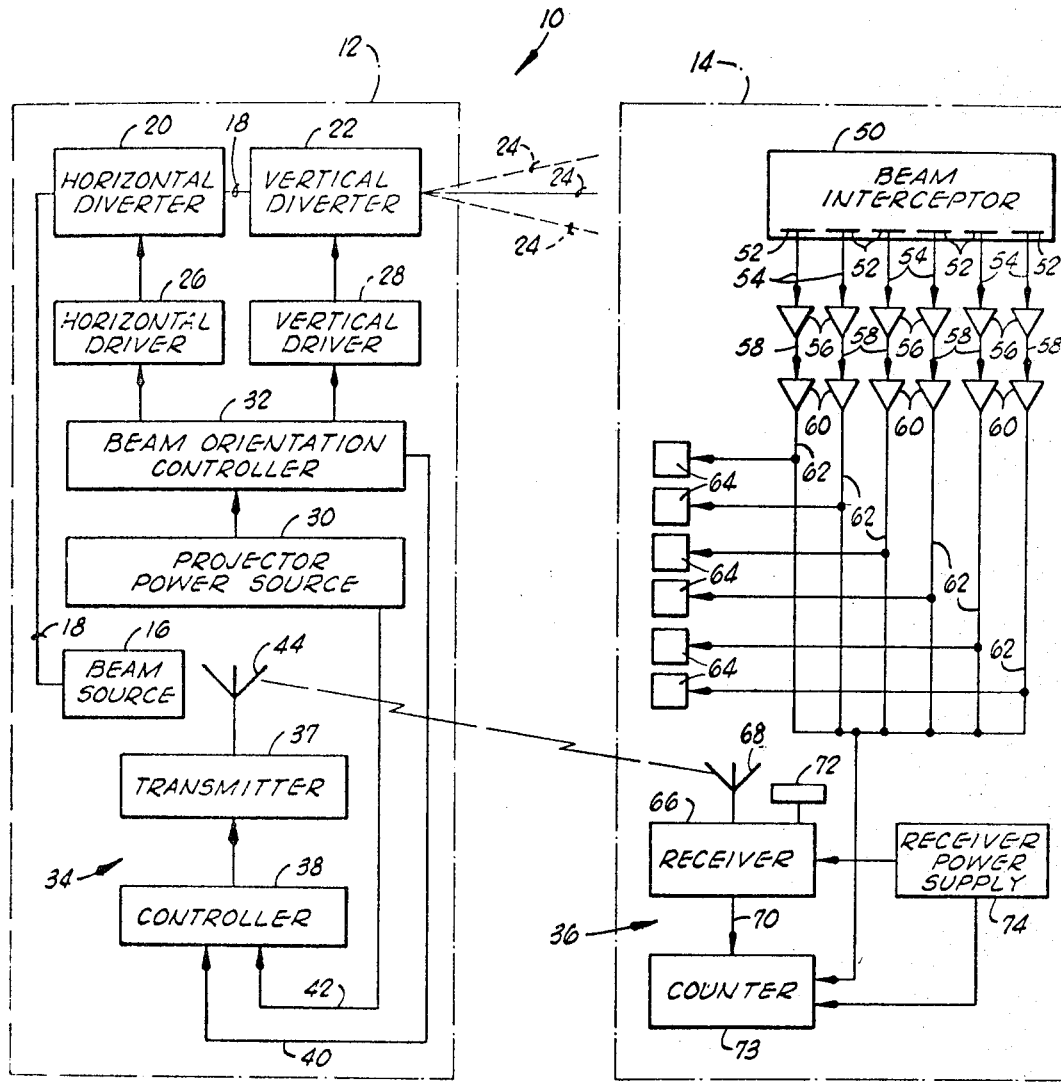
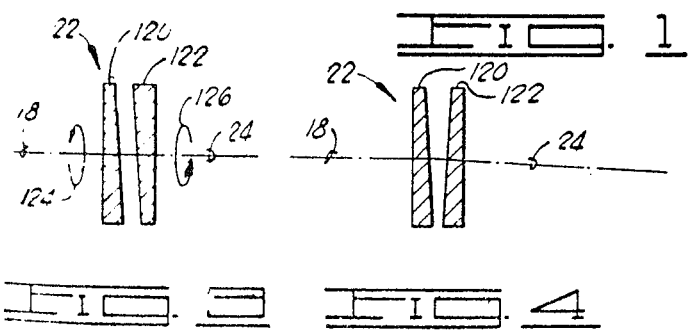

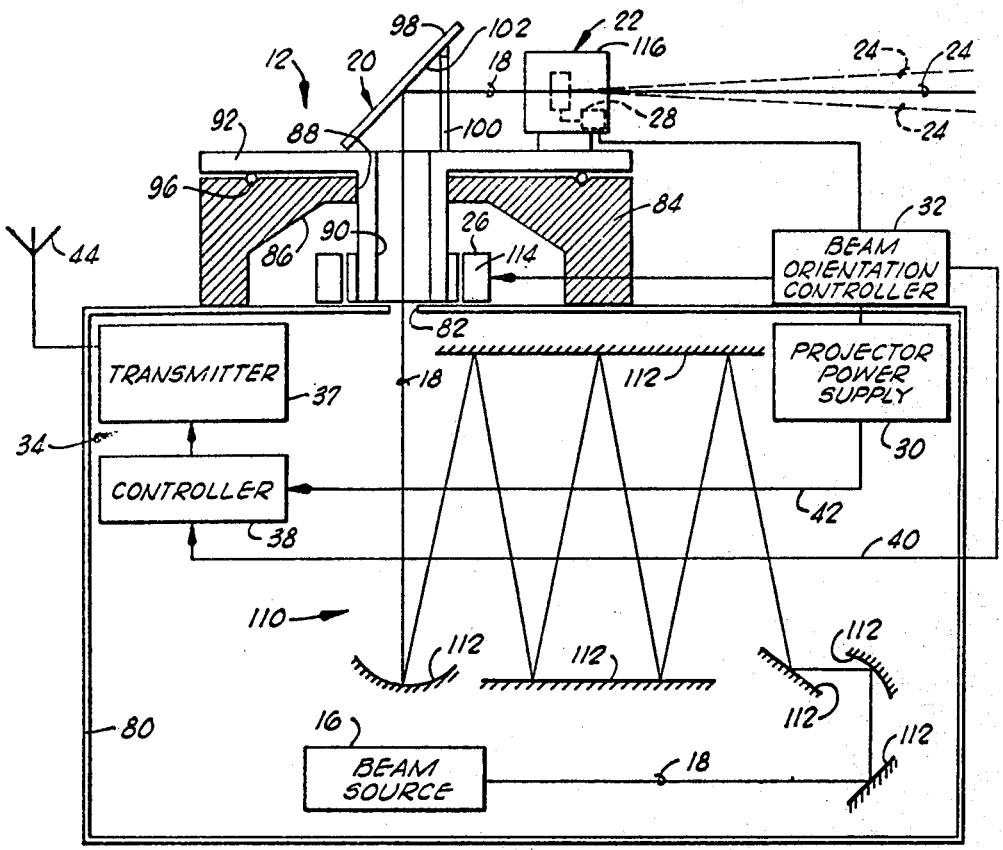
FIG. 2
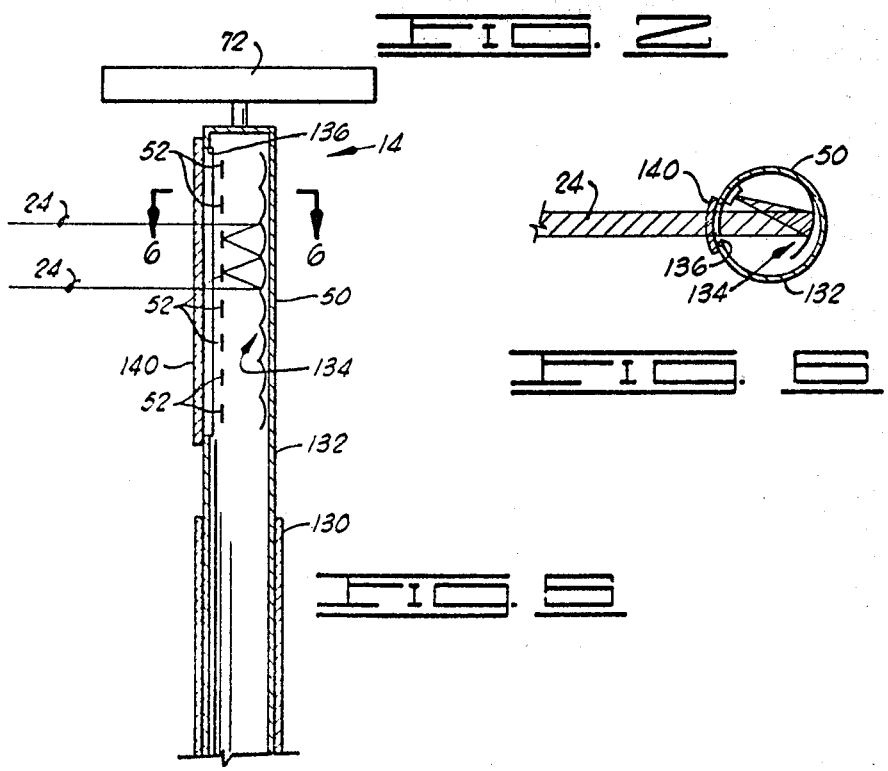
FIG. 6
FIG. 5

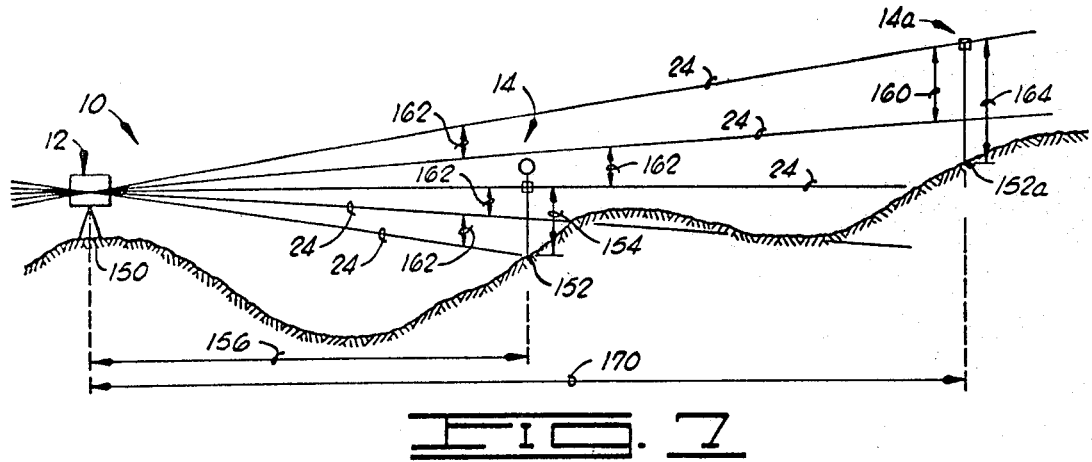
FIG. 7
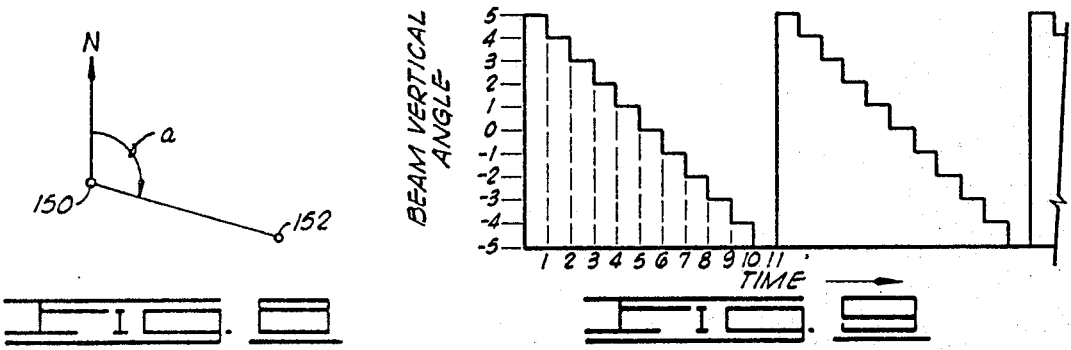
FIG. 8
FIG. 9
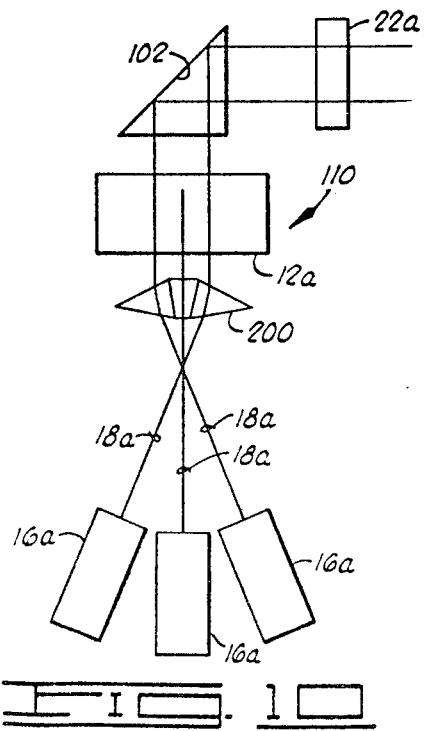
FIG. 10
FIG. 11

ROTATING BEAM SURVEYING METHOD AND APPARATUS

BACKGROUND OF THE INVENTION

1. Field of the Invention

This invention relates generally to improvements in surveying methods and apparatus and, more particularly, but not by way of limitation, to an improved surveying method and apparatus utilizing projected energy beams.

2. Brief Description of the Prior Art

In the past there have been proposed various methods and apparatus utilizing a laser beam for some particular surveying application. One such apparatus was disclosed in the United States Pat. No. 3,471,234, issued to Studebaker, which included a laser beam projected through a hub and reflected outwardly theefrom through a rotating optical device, the laser beam being aligned in a horizontal plane via a fluid-bubble level indicator. In one aspect of the Studebaker apparatus, the beam generator was initially algined with a first reference point of a known elevation, and other reference points were then established at predetermined angles with respect to the first reference point utilizing a number of "beam receiving rods" and a "beam blocking member."

One other device, proposed in the past, utilized a rotating laser beam in cooperation with a number of receiver stations, this particular apparatus being disclosed in the Great Britain Pat., No. 1,181,162. In this instance, the laser beam was rotated through 360° and was intercepted by three or more receiving stations at known locations, each receiving station transmitting a signal to a receiver, for establishing a bearing and the laser beam being optically shaped to have a large vertical spread and a narrow horizontal spread.

An electronic type of surveying apparatus was disclosed in the United States Patent No. 3,469,919, issued to Zellner, which utilized a rotatingly driven mirror for rotating the generated laser beam, the laser beam being disposed in a horizontal datum plane of a known elevation, and being utilized to activate a pair of vertically spaced photocells in a receiver station. In determining the elevation of the receiving station, the height of the receiving station was vertically adjusted to a position wherein the laser beam was centered generally between the two photocells, the laser beam having a predetermined vertical width for simultaneously activating both of the photocells.

Various other types of apparatus have been developed utilizing a laser beam or the like for determining some particular parameter to relate two or more spaced locations. Some devices, for example, included counter rotating wedges to oscillate a beam in a horizontal plane, such as disclosed in the United States Pat. No. 3,434,785, issued to Weber, and others utilized a beam for determining range and bearing indications or the like, such as typically disclosed in the United States Pat. No. 3,489,495, issued to Blau; and the United States Pat. No. 3,443,870, issued to Morgan.

SUMMARY OF THE INVENTION

The present invention contemplates an improved surveying apparatus wherein energy beams are projected at predetermined angular positions in a horizontal datum plane and in a vertical datum plane, and the projected energy beams are intercepted via a beam receiver, the position of the received, projected energy beams being identifiable in a horizontal and a vertical datum plane. More particularly, in one aspect, the surveying apparatus includes: a beam projector which generates a rotating energy beam through various predetermined angular positions in a horizontal datum plane and in a vertical datum plane; a beam receiver simultaneously receiving the projected energy beams over a predetermined range of diverted angular positions; and a control apparatus providing an output indication for identifying the arrival time of each intercepted, projected energy beam and for identifying the position of each intercepted, projected energy beam in a vertical datum plane and in a horizontal datum plane.

An object of the invention is to provide a more efficient and accurate surveying method and apparatus particularly useful in remote locations or areas having an irregular, generally rough terrain.

One other object of the invention is to provide a surveying method and apparatus having an efficient, accurate and positive beam identification.

A further object of the invention is to provide a surveying apparatus which is economical in construction and operation.

Another object of the invention is to provide a surveying method and apparatus wherein the various surveying parameters are determined in a more efficient, accurate and positive manner.

Other objects and advantages of the invention will be evident from the following detailed description when read in conjunction with the accompanying drawings which illustrate the various embodiments of the invention.

BRIEF DESCRIPTION OF THE DRAWINGS

FIG. 1 is a diagrammatical view of the surveying apparatus of the present invention.

FIG. 2 is a partial diagrammatical view, partial cross-sectional view of the beam projector of the surveying apparatus of FIG. 1.

FIG. 3 is a diagrammatical, cross-sectional view of a portion of the vertical diverter of the beam projector of FIGS. 1 and 2.

FIG. 4 is a cross-sectional, diagrammatical view of a portion of the vertical diverter of the beam projector of FIG. 1, similar to FIG. 3, but showing the vertical diverter in one other orientation thereof.

FIG. 5 is a partial cross-sectional, partial diagrammatical view of a portion of the beam interceptor of the beam receiver of FIG. 1.

FIG. 6 is a partial cross-sectional, partial diagrammatical view of a portion of the beam interceptor of FIG. 5, taken substantially along the lines 6—6 of FIG. 5.

FIG. 7 is a side elevational, diagrammatical view illustrating one operational aspect of the surveying apparatus of FIG. 1.

FIG. 8 is a plan, diagrammatical view illustrating one other operational aspect of the surveying apparatus of FIG. 1.

FIG. 9 is a diagrammatical view illustrating an operational portion of the control apparatus of the surveying apparatus of FIG. 1.

FIG. 10 is a diagrammatical, elevational view of a modified beam projector.

FIG. 11 is a diagrammatical plan view of the modified beam projector of FIG. 10.

DESCRIPTION OF THE PREFERRED EMBODIMENT

Referring to the drawings in general and to FIGS. 1 through 9 in particular, diagrammatically shown therein and designated by the general reference numeral 10 is a surveying apparatus which basically includes a beam projector 12 and a beam receiver 14. The surveying apparatus 10 is constructed to provide a more effective, efficient and faster determination of various surveying parameters of a receiver location utilizing energy beams projected from a projector location and intercepted at the receiver location, the beam receiver 14 being positioned at the receiver location and the beam projector 12 being positioned at the projector location.

The beam projector 12 includes a beam source 16 which is constructed to generate an energy beam having a narrow beam width in a horizontal and a vertical plane and being in the nature of a high intensity, coherent light beam, for example, the generated energy beam being diagrammatically shown and designated by the reference numeral 18. A generated beam of the type described before with respect to the generated beam 18 can be produced via a continuous wave laser such as a gas laser or solid crystalline laser, for example, such generated energy beams and the apparatus for producing same each being well known in the art and, in view of the detailed description of the surveying apparatus 10 contained herein, a detailed description of a particular beam source and generated energy beam is not required herein.

The generated energy beam 18 is directed through a horizontal diverter 20 and a vertical diverter 22 and is then projected from the beam projector 12, the energy beams projected from the beam projector 12 being diagrammatically shown in the drawings and designated by the reference numeral 24. In the preferred form, the beam projector 12 generates and projects a single, rotating energy beam having, as a function of time, known angular positions in a vertical datum plane and a known azimuth or, in other words, known angular positions in a horizontal datum plane.

The horizontal diverter 20 rotates the generated energy beam 18 through various angular positions in a horizontal datum plane, and the vertical diverter 22 is constructed to divert the generated energy beam 18 through various known, discrete angular positions in a vertical datum plane. The horizontal diverter 20 is driven via a horizontal driver 26, and the vertical diverter 22 is driver via a vertical driver 28, the horizontal driver 26 and the vertical driver 28 each being connected to a projector power source 30 via a beam orientation controller 32.

The beam orientation controller 32 is constructed to connect the projector power source 30 to a portion of the horizontal driver 26 and to connect the projector power source 30 to a portion of the vertical driver 28 in such a manner that the horizontal diverter 20 and the vertical diverter 22 are each driven in a controlled, programmed manner, whereby the various projected energy beams from the beam projector 12 are each identifiable as a function of time with respect to a particular angular position in a horizontal and a vertical plane. The beam orientation controller 32 is, in a preferred form, programmed to connect the vertical diverter 22 in such a manner that one of the projected energy beams transmitted from the beam projector 12 is oriented in a substantially horizontal plane, and such that a predetermined number of projected energy beams are transmitted from the beam projector 12 at diverted angular positions vertically above and below the horizontally oriented, projected energy beams, two of the diverted angularly positioned, projected energy beams being diagrammatically shown in dashed-lines in FIGS. 1 and 2.

The beam projector 12 also includes a control signal source 34 which, in one form, is connected to the beam orientation controller 32, and constructed to transmit a radio signal at predetermined controlled times, such controlled times being, in a preferred form, determined in accordance with the angular position of the projected energy beam in a horizontal datum plane. For example, the radio signal is transmitted each time the projected energy beam passes a predetermined angular position in a horizontal datum plane (true North, in one form), and, in a preferred form, the angular position of the projected energy beam is simultaneously changed to a predetermined angular position in a vertical datum plane. The signal source 34 is in communication with a signal receiver 36 of the beam receiver 14, the signal transmitted from the signal source 34 being utilized to activate the signal receiver 36 at controlled times for identifying the various projected energy beams intercepted by the beam receiver 14, determining the arrival of the projected energy beams and orienting the beam receiver 14 in an optimum, determined position for receiving the projected energy beams, in a manner and for reasons which will be made more apparent below.

The signal source 34, more particularly, includes a transmitter 37 connected to a controller 38, the controller 38 being connected to the beam orientation controller 32 and to the projector power soruce 30 for receiving control signals 40 and 42 therefrom. The controller 38 is constructed to activate the transmitter 37 in response to the signal 40 from the beam orientation controller 32, in one operational aspect of the surveying apparatus 10. The transmitter 37, more particularly, generates a control signal, and the transmitter control signal is radiated therefrom via an antenna 44, in an activated position of the transmitter 37, transmitters constructed to generate control signals being well known in the art.

Referring more particularly to the beam receiver 14 of the surveying apparatus 10, the beam receiver 14 includes a beam interceptor 50 having a plurality of spaced detectors 52 supported therein, the detectors 52 being spaced vertically along a portion of the length of the beam interceptor 50, as shown in FIG. 5. The beam interceptor 50 is constructed to receive and intercept one or more of the projected energy beams from the beam projector 12 over a predetermined range of vertical, diverted angular positions of the projected energy beam, for reasons and in a manner to be made more apparent below.

Each detector 52 is constructed to receive and intecept energy from a projected energy beam and to provide an output signal 54 proportional to the light flux intensity of the projected energy beam received thereby, the detectors 52 each being of the photocell or solid state devices, for example. While only one detector 52 may be energized by a single, projected energy beam, the vertical spread of the projected energy beam particularly at relatively long distances from the beam projector 12, may be sufficient to cause several adjacent or near detectors 52 to be simultaneously energized, each detector 52 being energized to a different extent. Utilizing the resulting energy distribution, the position of the center of the projected energy beam can be determined. The output signal 54 from each of the detectors 52 is connected to an amplifier 56, which provides an amplified signal 58 which is, of course, also proportional to the light flux intensity of the intercepted, projected energy beam received by the detector 52 connected thereto.

Each amplifier 56 is connected to a sample-hold amplifier 60 such that the amplified output signal 58 from each of the amplifiers 56 is received by one of the sample-hold amplifiers 60. Each sample-hold amplifier 60 is connected to a beam position indicator 64, each beam positioned indicator 64 receiving the output signal 62 from one of the sample-hold amplifiers 60 and providing an output indication responsive to the received output signal 62 from the sample-hold amplifier 60 connected thereto. The output indications of the beam position indicators 64 can be, in one form, in the nature of an electrical signal the frequency or amplitude of which is indicative of the light flux of the projected energy beam intercepted by the detector 52 connected thereto, or, in other words, the output indications of the beam position indicators 64 provide an indication that a projected energy beam has been intercepted by the beam interceptor 50, the output indication thus being indicative of the arrival time of the intercepted, projected energy beam. The output indications of the beam position indicators 64 are utilized to identify the particular intercepted, projected energy beam in a vertical datum plane; that is, the angular position thereof relative to a horizontal datum plane, in a manner briefly mentioned before and in a manner which will be described in greater detail below.

The signal receiver 36 of the beam receiver 14 includes a receiver 66 having a non-directional antenna 68 for receiving the transmitted control signal from the transmitter 37 of the beam projector 12. The receiver 66 is, in a preferred form, constructed such that a portion thereof is activated via the transmitted control signal and such that the receiver 66 has an output signal 70 for activating other control assemblies of the surveying apparatus 10, in a manner which will be made more apparent below.

In a preferred form, the receiver 66 also includes a portion for receiving a signal output from a directional antenna 72, rotatably supported on a portion of the beam receiver 14. During one aspect of the operation of the surveying apparatus 10, the directional antenna 72 is rotated and receives the transmitted control signal from the transmitter 36 of the beam projector 12, the amplitude of the signal received by the directional antenna 72 being responsive to the orientation of the directional antenna 72 with respect to the location of the transmitter 37. In this embodiment of the surveying apparatus and during this aspect of the operation thereof, a portion of the receiver 66 is constructed to provide an output indication responsive to the amplitude of the received transmitted control signal, the output indication being utilized to orient the beam receiver 14 in an optimum position with respect to the beam projector 12 and, more particularly, to orient the beam interceptor 50 is an optimum position for intercepting and detecting the various projected energy beams from the beam projector 12.

A portion of the receiver 66 of the beam receiver 14 is connected to a counter 73, and a portion of the counter 73 is also connected to the output signals 62 of each of the sample-hold amplifiers 60. More particularly, the counter 73 is constructed and connected to the receiver 66 to receive the output signal 70 therefrom, indicating that a transmitted control signal has been received by the receiver 66, the counter 73 being constructed and connected to the receiver 66 and the sample-hold amplifiers 60 to provide an audible, visual, electrical or other such output indication, in one position thereof. In one form, the counter 73 has an activated and a non-activated position, and includes a timing mechanism which is activated and de-activated in response to the output signals 70 and 62, the output indication of the counter 73 providing a read-out indication indicative of the angular position of the projected energy beam in a horizontal datum plane, during one aspect of the operation of the surveying apparatus 10, and an output indication indicative of the lapsed time occuring between the time when the counter 73 was initially activated and the time when the counter 73 was subsequently de-activated, during one other aspect of the operation of the surveying apparatus 10, for reasons and in a manner which will be made more apparent below.

The beam receiver 14 also includes a receiver power supply 74 which is connected to the receiver 66 and to the counter 73 to provide the operating power therefor.

A preferred embodiment of the beam projector 12 is shown in more detail in FIG. 2 and, as shown therein, the beam projector 12 includes a projector housing 80 which is constructed to support or retain the various assemblies and components of the beam projector 12. The projector housing 80 has an opening 82 formed through a portion of an upper surface thereof, and a table support 84, having a cavity 86 formed therein and intersecting a lower surface thereof, is secured to the upper surface of the projector housing 80 in such a manner that the cavity 86 substantially encompasses the opening 82 through the projector housing 80. An opening 88 is formed through the upper surface of the table support 84, and a portion of the opening 88 intersects a portion of the cavity 86, the opening 88 being substantially aligned with the aperture 82 formed through the upper surface of the projector housing 80, for reasons which will be made more apparent below.

A hollow shaft 90 is journally disposed through the opening 88 of the table support 84, one end of the hollow shaft 90 being generally disposed near the upper surface of the projector housing 80 in a position wherein the hollow opening through the hollow shaft 90 is substantially aligned with the aperture 82 through the projector housing 80. A rotating table 92 is formed on the end of the hollow shaft 90, opposite the end thereof disposed generally near the projector housing 80, the rotating table 92 extending generally radially from the hollow shaft 90 and being disposed and rotatingly supported on the upper surface of the table support 84. A bearing support 96 is disposed a portion of the upper surface of the table support 84, the bearing support 96 engaging a portion of the lower surface of the rotating table 92 and the adjacent portion of the table support 84 such that the rotating table 92 is rotatingly supported by the table support 84

A mirror 98 is securely positioned on an upper portion of the rotating table 92 via a mirror support 100, the mirror support 100 being positioned to support the mirror 98 such that the front surface 102 of the mirror 98 is disposed and supported at an angle, preferably 45° in one form, with respect to the axial axis through the hollow shaft 90. More particularly, the mirror 98 is disposed to position the front surface 102 thereof for reflecting the generated energy beam 18 in a substantially horizontal plane, for reasons and in a manner which will become more apparent below.

An optical assembly 110, having a plurality of optical reflecting surfaces 112, is interposed generally between the beam source 16 and the rotating table 92, the reflecting surfaces 112 being constructed and positioned to reduce the generated energy beam in divergence as the generated energy beam is reflected therethrough and forming what is commonly referred to as an inverted folded telescope. The optical assembly 110 is oriented with respect to the aperture 82, the hollow shaft 90, and the front surface 102 of the mirror 98 to reflectingly project the generated energy beam 18 through the hollow shaft 90 and onto the front surface 102 of the mirror 98, the generated energy beam 18 being then reflected in a substantially horizontal plane with respect to the upper surface of the rotating table 92.

The horizontal driver 26, in a preferred form, includes a direct current motor 114 which is connected to the hollow shaft 90 to rotate the rotating platform 92 thereby rotating the mirror 98 and the energy beam reflected therefrom in a horizontal plane, in an actuated position of the motor 114. The horizontal driver 26 is controlled by the beam orientation controller 32 which, in one form, may include a binary coded disc servo feedback system or a synchronous motor or other such constant speed motor for controlling the motor 114 to drivingly rotate the rotating table form 92 at predetermined, controlled angular speeds, thereby rotating the energy beam at controlled, predetermined angular speeds, for reasons which will be made more apparent below.

As shown in FIG. 2, the vertical diverter 22 and the vertical driver 28 are each supported within a housing 116, the housing 116 being secured to an upper portion of the rotating table 92 and oriented with respect to the front surface 102 of the mirror 98 such that the generated energy beam 18 reflected therefrom is transmitted through the vertical diverter 22. In a preferred form, the vertical diverter 22 basically comprises two wedge-shaped prisms 120 and 122, each wedge-shaped prism 120 and 122 having a low vertical angle and being rotatingly supported in the housing 116. Each wedge-shaped prism 120 and 122 is connected to the vertical driver 28 such that the prisms 120 and 122 are rotatingly driven in opposite directions, as indicated in FIGS. 3 and 4 by rotational directions 124 and 126. For the purpose of clarity, the energy beam emerging from the prisms 120 and 122 is referred to above and below as the projected energy beam 24.

As shown in FIG. 3, the prism 120 and 122 of the vertical diverter 22 have been rotated to a mutually compensating position wherein the generated energy beam 18 is transmitted therethrough with substantially no horizontal or vertical deviation. As shown in FIG. 4, the prisms 120 and 122 of the vertical diverter 22 have been rotated to a position wherein the prisms 120 and 122 are in opposite correlation and, in this position of the vertical diverter 22, the generated energy beam 18 undergoes a maximum vertical deviation, the projected energy beam 24 being transmitted from the beam projector 12 at a maximum or a minimum diverted angular position.

Referring more particularly to the beam receiver 14, a portion of a preferred embodiment of the beam interceptor 50 is shown in greater detail in FIGS. 5 and 6, and includes an outer hollow support tube 130, the hollow portion thereof being sized to telescopingly receive an inner hollow support tube 132, the inner tube 132 being telescopingly disposed within the outer support tube 130 so the height of the end of the inner tube 132, opposite the end thereof which is telescopingly disposed in the outer support tube 130, can be raised and lowered. A plurality of parabolic, concave mirrors 134 are supported within a portion of the hollow portion of the inner tube 132, each concave mirror 134 being positioned to focus light onto one of the detectors 52.

An opening 136 is formed in a portion of the inner tube 132, the opening extending a distance vertically along the inner tube 132 and being sized to receive the projected energy beam from the beam projector 12, as shown more clearly in FIGS. 5 and 6. A protective cover 140 is secured to the inner tube 132, generally encompassing the opening 136. The cover 140, in a preferred form, is constructed of a "window" material which will preferably allow the type of projected energy beam 24 to pass therethrough, during the operation of the surveying apparatus 10.

The opening 136 and the cover 140 disposed thereabout are each oriented on the inner tube 132 with respect to the concave mirrors 134 such that a projected energy beam 24 can pass through the opening 136 and reflect from one of the concave mirrors 134 onto one of the detectors 52. More particularly, the reflecting surface of each of the concave mirrors 134 is generally alinged with the light opening of the inner tube 132 formed by the opening 136 and the cover 140, and spaced 180° therefrom, and each detector 52 is located in a substantially common horizontal plane with one of the concave mirrors 134 to receive the focused, reflected projected energy beam 24 therefrom, as shown more clearly in FIG. 6.

As shown in FIG. 5, the directional antenna 72, in one form, can be located generally on top of the inner tube 132 of the beam interceptor 50.

In a preferred form, the vertical driver 28 is, more particularly, of a stepping motor type of construction, the vertical driver 28 rotating the prisms 120 and 122 in controlled steps such that the projected energy beam is angularly diverted at a known angle for a predetermined period of time controlled by the period of each step of the vertical driver 28, an example of such a stepping function being illustrated in FIG. 9. For example, the beam orientation controller 32 and the vertical driver 28 can be constructed and synchronized with the horizontal driver 26 such that the projected energy beam is diverted to known angular positions by the vertical diverter 22 for each period of time during which the projected energy beam is rotated through 360 degrees by the horizontal diverter 20. As shown in FIG. 9, the vertical diverter 22 diverts the projected energy beam through eleven diverted angular positions, designated (5) to (−5), as a function of time. Assuming each unit of time, designated (0) to (11) in FIG. 9, represents 1 second, and further, assuming that the beam orientation controller 32 and the horizontal driver 26 are constructed to rotate the projected energy beam through 360° each second, then the projected energy beam would be rotated and diverted through one complete cycle in 11 seconds, for example.

During the operation of the surveying apparatus 10, the beam receiver 14 is remotely located a distance from the beam projector 12, and the beam interceptor 50 is constructed to intercept and receive the projected energy beams over a predetermined range of diverted angular positions, as mentioned before. The beam orientation controller 32 has an output signal 40 connected to the controller 38 of the transmitted 37, as mentioned before. In a preferred form, the beam orientation controller 32 activates the transmitter 37 via the controller 32 each time the beam orientation controller 32 activates the vertical driver 28 to divert the projected energy beam, the resulting transmitted control signal being received by the receiver 66 of the beam receiver 14. During this operational aspect of the surveying apparatus 10, the receiver 66 of the beam receiver 14 will activate a portion of the counter 73 via the control signal 70 each time the angular position of the projected energy beam is diverted by the vertical driver 28, and thus a portion of the counter 73 provides an output indication indicative of the diverted angular position of the projected energy beam, such indication being subsequently utilized to determine some of the surveying parameters in a manner which will be described in greater detail below. An approximation of the useful diverted angles of the projected energy beams can be determined considering the maximum, feasible extension of the inner tube 132, in a practical application. For example, considering an extension of the inner tube 132 of 40 feet, and assuming the beam interceptor 50 is designed to intercept two energy beams at a design, maximum distance of 20 miles, the energy beam would have a maximum and a minimum elevation angle of approximately (3.5) minutes to (−3.5) minutes, corresponding to the beam vertical angles of (5) to (−5) in FIG. 9.

OPERATION OF FIGS. 1 THROUGH 9

The surveying apparatus 10, described in detail before, is particularly constructed to provide a fast, efficient and accurate land surveying apparatus which is particularly useful in surveying primitive, remote areas, regardless of the particular conditions of the terrain. The beam projector 12 is initially positioned at a projector location 150, as shown in FIG. 8, the projector location 150 being preferably at a relatively high elevation with respect to the surrounding terrain to be surveyed and remotely positioned with respect to the beam receiver 14 at a receiver location 152, a second beam receiver 14a being shown in FIG. 7, positioned at a second receiver location 152a, to more clearly illustrate some aspects of the operation of the surveying apparatus 10. The projector power source 30 and the beam source 16 are each activated to generate the energy beam 18 which is projected from the beam projector 12, and the beam projector 12 is adjusted to initially align the vertical axis of the rotating table 92.

After the beam projector 12 has been located at the projector location 150 and the beam receiver 14 has been located at the receiver location 152, the beam receiver 14 must be properly oriented with respect to the beam projector 12; that is, the beam opening formed by the opening 136 and the cover 140 in the beam receiver 14 must be oriented with respect to the beam projector 12 such that the projected energy beam therefrom is received through the beam opening. The orientation of the beam receiver 14 with respect to the beam projector 12, is then accomplished by activating the transmitter 37 of the beam projector 12 and activating the directional antenna 72 of the beam receiver 14. In the activated position of the transmitter 37, the directional antenna 72 and the receiver 66, the beam interceptor 50 is then rotated to a position wherein the receiver 66 indicates a maximum amplitude signal from the transmitter 37, thereby indicating the directional antenna 72 is aligned with the transmitted control signal from the transmitter 37. The beam receiver 14 can thus be quickly, efficiently and positively oriented with respect to the beam projector 12.

The beam orientation controller 32 is then set for the particular surveying application, and also set with respect to the orientation of the beam projector 12 such that, as the projected energy beam from the beam projector 12 passes through a geographic north position (indicated in FIG. 8 by the letter N), the beam orientation controller 32 actuates the controller 38 to activate the transmitter 37, thereby producing a transmitted radio signal radiated via the antenna 44. The transmitted radio signal from the transmitter 37 activates the receiver 66 and the signal 70 therefrom activates the counter 73. When the projected energy beam 24 is intercepted by the beam interceptor 50 of the beam receiver 14, the signal 62 produced by any of the detectors 52 automatically de-activates the counter 73. Thus, the counter 73 was activated for the period of time beginning at the time the projected energy beam was aligned with a geographic north position (N) and ending at the time the projected energy beam was intercepted by the beam interceptor 50. Since the projected energy beam 24 is rotated by the beam projector 12 at a known angular speed ($W_o$), the azimuth (a) of the receiver location can be determined utilizing the read-out indication of the counter 73 (diagrammatically illustrated in FIG. 8). For example, the counter 73 can be calibrated to provide a read-out indication in terms of "time" and the angle "a" between geographic north (N) and the receiver location 152 can be determined as follows:

$$a = W_o t \qquad (1)$$

wherein:
 $t$ = the time measured by the counter 73 for the projected energy beam to be rotated from geographic north (N) to the receiver location 152.

It should also be noted that the counter 73, in one form, can be scaled to provide an output indication in degrees and minutes of an arc, assuming a constant angular rotating speed $W_o$ of the projected energy beam transmitted from the beam projector 12, thereby directly indicating the azimuth of the receiver location 152.

The beam orientation controller 32 is then actuated to connect the projector power source 30, to the horizontal driver 26 and the vertical driver 28 in such a manner that the projected energy beams are rotated through predetermined angular positions with respect to a vertical datum plane and a horizontal plane, as described before. The inner tube 132 of the beam interceptor 50 is then telescoped inwardly and outwardly with respect to the outer tube 130 thereof, thereby adjusting the height of the beam interceptor 50 to a position wherein the beam interceptor 50 intercepts and receives a maximum number of projected energy beams 24. The intercepted projected energy beams 24 are reflected by the concave mirrors 134 onto the detectors 52, thereby producing an output signal responsive to the arrival time of the intercepted received projected energy beams.

The transmitter 37 of the beam projector 12 is activated via the orientation prientation controller 32 each time the vertical driver 28 diverts the angular position of the projected energy beam, and the counter 73 of the beam receiver 14 is activated via the control signal 70 of the receiver 66 in response to the diverting of the angular position of the projected energy beam, in a manner described before. The counter 73 thus retains information indicative of the diverted angular position of the projected energy beam and, when the projected energy beam is intercepted by the beam interceptor 50 as indicated by the output of the beam position indicators 64, the diverted angular position of the particular intercepted projected energy beam is determinable and identifiable via the output indication of the counter 73.

To determine the elevation of the receiver location 152, the height of the beam interceptor 50 can be telescopingly adjusted to a position wherein the beam interceptor 50 intercepts the horizontally oriented, projected energy beam 24 from the beam projector 12 (assuming the vertical diverter 22 is in a de-activated position). In this position of the beam receiver 14, the elevation of the receiver location 152 will be equal to the elevation of the projector location 150 ($E_o$) minus the distance 154 through which the beam interceptor 50 was raised to intersect the horizontally oriented, projected energy beam. In this operational aspect, the elevation determination does not depend on the distance 156 between the projector location 150 and the receiver location 152.

This particular elevation determination, lastmentioned above, can be made in an activated position of the vertical diverter 22, since the horizontally oriented, projected energy beam transmitted from the beam projector 12 is identifiable and determinable via the output indications of the beam position indicators 64 and the output indication of the counter 73, as described above.

The elevation of the receiver locations can also be determined utilizing the surveying apparatus 10 and the information determined from a projected energy beam projected at some diverted angle with respect to a horizontal plane. For example, the elevation of the receiver location 152a is determined as follows:

$$E = E_o + (j)(\Delta h) - h \tag{2}$$

wherein:
$E$ = The elevation of the receiver location;
$E_o$ = The known elevation of the projector location;
$j$ = A beam identification factor determined by considering that the beam orientation controller 32 controls the vertical diverter 22 such that projected energy beams are sequentially projected at multiples (positive or negative) of an incremental angle ($\Delta A$) and a single beam angle ($j\Delta A$) is varied as a known step function of time "$\Delta A$" being designated in FIG. 7 by the reference numeral 162.
$\Delta h$ = The vertical distance between two adjacent projected energy beams intercepted by the beam interceptor 50 determined at the receiver location, one such vertical distance being designated in FIG. 7 by the numeral 160, for example.
$h$ = The vertical distance or height at which the beam interceptor 50 was raised to intercept the $j^{th}$ projected energy beam designated in FIG. 7 by the reference numeral 164.

The distance ($d$), designated in FIG. 7 by the numeral 170, between the receiver location 152a and the projector location 150 is determined by measuring the differential height 160 between successive projected energy beam positions, as follows:

$$d = \Delta h / \Delta A \tag{3}$$

It should be noted that the measurement of the distance ($d$) in the algebraic expression (3) above is an approximate measurement, due to the approximate nature of the measurement of $\Delta h$, particularly at relatively large distances between the beam projector 12 and the beam receiver 14. It should also be noted that the surveying apparatus 10 is constructed such that other methods can be utilized to determine various distance measurements such as the displacement at right angles to the known azimuth of the beam receiver 14 through an accurately measured horizontal distance or offset. This offset when combined with the difference of azimuths as determined by the surveying apparatus 10 will enable a more accurate determination of distance to the beam projector 12, in a manner which will be apparent from the foregoing to those skilled in the art.

The horizontal diverter 20 has been described above as rotating the projected energy beam through various angular positions in a horizontal datum plane and the vertical diverter 22 has been described above as diverting the projected energy beam through various diverted angular positions in a vertical datum plane, for the purpose of clarity and for the purpose of separately identifying the function of the horizontal diverter 20 and the vertical diverter 22. However, it will be apparent to those skilled in the art from the foregoing that the horizontal diverter 20 and the vertical diverter 22 each cooperate in such a manner that the projected energy beam, in fact, describes the surface of a cone as the projected energy beam is rotated about the beam projector 12 at diverted angular positions, and that the projected energy beam, in fact, describes a horizontally oriented planar surface as the projected beam is rotated about the beam projector 12 at a diverted angular position of 0°, in one position of the vertical diverter 22. In any event the angular position of the projected energy beam in a vertical and a horizontal datum plane is identifiable and this information is correlated with the detection of the intercepted, projected energy beam such that the angular position of the intercepted, projected energy beam in a horizontal and a vertical datum plane is determinable.

In one preferred operational embodiment, the beam projector 12 is remotely disposed with respect to the beam receiver 14 and the beam projector 12 and the beam receiver 14 are each constructed such that the beam projector 12 is automatically operated via an interconnection between the beam orientation controller 32 and the transmitter 37, the transmitter 37 being modified to receive a control, transmitted signal from a remote location such as the location of the beam receiver 14, for example, In this manner two or more beam projectors 12 can be placed at known locations, each beam projector 12 being remotely and automatically controlled to project energy beams having determinable positions in a horizontal and a vertical plane. In this operational embodiment, the various data indicative of the position of the projected energy beams in a horizontal and a vertical plane can be transmitted from the projector locations back to the receiver positions.

It should be noted that the transmitter 37, the beam position indicator 64 and the receiver 66 can each be modified in such a manner that the various data indicated at the receiver position can be transmitted back to the projector location. In this manner the various data collected from a plurality of receiver locations can be accumulated at a central location.

From the foregoing, it will be apparent to those skilled that the term "transmitter," utilized to identify the transmitter 37, and the term "receiver" utilized to identify the receiver 66 are used herein solely for the purpose of clarity of description; and, in fact, the transmitter 37 and the receiver 66 each each constructed to transmit and receive control signals, in one form of the invention, as described above.

Although the interceptor 50 has been described as being telescopingly adjustable to various heights, there are, of course, other methods such as a balloon lift type of device, for example, which may be desirable in some applications. The surveying apparatus 10 is also constructed such that generated energy beams of an infrared nature may be utilized to make use of more transparent "windows" in the transmission characteristics of the atmosphere. Furthermore, the particular projected energy beam may be identified by the relatively short period of time that the projected energy beam is turned off or, in other words, not being projected.

From the foregoing detailed discussion of the surveying apparatus 10, it will be apparent to those skilled in the art that various standard surveying procedures and techniques can be employed utilizing the surveying apparatus 10 such as triangulation, for example.

DESCRIPTION OF FIGS. 10 AND 11

Diagrammatically shown in FIGS. 10 and 11 is a modified beam projector 12a which is constructed to simultaneously generate a plurality of energy beams, each generated energy beam 18a having a different wave length (color). The generated energy beams 18a each are generated via a modified beam source 16a.

The generated energy beams 18a are each transmitted through a parallel prism 200. The modified beam sources 16a are oriented to project the generated energy beams 18a into the parallel prism 200, and the parallel prism 200 is constructed to orient the generated energy beams in a spaced parallel relationship. The parallel, generated beams 18a are then directed through the optical assembly 110 and reflected through modified vertical diverter 22a. The modified vertical diverter 22a includes a plurality of wedge-shaped prisms similar to the wedge-shaped prisms 120 and 122, described before, each pair of wedge-shaped prisms in the modified vertical diverter 22a being oriented to divert one of the generated energy beams 18a to various predetermined angular positions in a vertical plane.

The spaced, parallel, generated energy beams 18a are simultaneously projected from the modified beam projector 12a. The beam receiver 14 and, more particularly, the beam interceptor 50 is constructed to intercept the simultaneously projected energy beams. Since each of the projected energy beams thus intercepted has a separate, identifiable wave length, the projected energy beams are identifiable via the plurality of spaced intensity indicators 64. The modified beam projector 12a will thus cooperate with the beam receiver 14 such that the surveying apparatus will operate in a manner similar to that described before, the salient difference being the manner in which the various intercepted projected energy beams are identifiable.

Changes may be made in the construction and the operation of the various parts or the elements of the various embodiments disclosed herein without departing from the spirit and scope of the present invention as defined in the following claims.

What is claimed is:

1. A surveying apparatus comprising:
   beam projector means for generating an energy beam and projecting the energy beam therefrom, comprising:
   beam source means generating the energy beam;
   a horizontal diverter rotating the energy beam in a horizontal datum plane in a driven position thereof;
   a horizontal driver connected to the horizontal diverter driving the horizontal diverter rotating the energy beam in a horizontal datum plane;
   a vertical diverter connected to a portion of the horizontal diverter and rotated in a rotated position of the horizontal diverter, the vertical diverter diverting the energy beam to predetermined angular positions in a vertical datum plane in a driven position thereof; and
   a vertical driver connected to the vertical diverter driving the vertical diverter positioning the energy beam in controlled, predetermined angular positions in a vertical datum plane during the rotation of the energy beam in a horizontal datum plane;
   beam receiver means intercepting the projected energy beam in one angular position thereof in a horizontal and a vertical datum plane and providing an output signal responsive to the intercepted, projected energy beam; and
   means receiving the output signal responsive to the intercepted, projected energy beam and identifying the angular position of the intercepted, projected energy beam in a horizontal and a vertical datum plane.

2. The surveying apparatus of claim 1 defined further to include more than one beam source means, each beam source means generating an energy beam having an identifiable wave length; a parallel prism inter-posed between the beam source means and the horizontal diverter orienting the generated energy beams in a spaced parallel relationship; and wherein the horizontal diverter rotates each of the energy beams in a predetermined hori-zontal datum plane in a driven position thereof; and wherein the vertical diverter diverts each of the energy beams to predetermined, distinct angular positions in a vertical datum plane; and wherein the output signal of the beam receiver means is defined further as being responsive to the wave length of the intercepted, projected energy beams.

3. The surveying apparatus of claim 1 wherein the horizontal diverter includes: rotating table means; and mirror means supported on the rotating table means reflecting the generated energy beam; and wherein the means driving the horizontal diverter rotatingly drives the rotating table means to rotate the energy beam reflected from the mirror means in a horizontal datum plane.

4. The surveying apparatus of claim 1 wherein the vertical diverter includes: prism means rotatably supported in a portion of the projector means, the prism means angularly diverting the generated energy beam passing therethrough at predetermined angles in a vertical datum plane in predetermined rotated positions of the prism means; and wherein the means driving the vertical diverter includes a portion drivingly connected to the prism means rotating the prism means to predetermined rotated positions.

5. The surveying apparatus of claim 1 wherein the beam receiver means is defined further to include:
   beam interceptor means vertically adjustable to predetermined heights; and
   vertically spaced detectors supported within the beam interceptor means intercepting the projected energy beams over a predetermined range of angular positions in a vertical datum plane, each detector intercepting a projected energy beam providing an output signal responsive thereto; and
wherein the means for identifying the angular position of the intercepted, projected energy beams includes:
   a plurality of beam position indicators, each beam position indicator connected to one of the detector and providing an output indication of the height of the detector intercepting the projected energy beam.

6. The surveying apparatus of claim 5 defined further to include: a plurality of sample-hold amplifier means, each sample-hold amplifier means connected to one of the detector and to one of the beam position indicators.

7. The surveying apparatus of claim 5 wherein the beam interceptor means includes: an opening receiving the projected energy beams therethrough; and a plurality of vertically spaced mirror means, each mirror means intercepting the projected energy beam reflecting the intercepted projected energy beam onto one of the detectors.

8. The surveying apparatus of claim 7 wherein the beam projector means is defined further to include:
   transmitter means radiating a transmitted control signal, in one position thereof; and
wherein the beam receiver means is defined further to include:
   receiver means receiving the transmitted control signal for the transmitter means; and
   directional antenna means connected to the beam interceptor means and to the receiver means, the receiver means providing an output indication responsive to the orientation of the directional antenna means indicative of an aligned position of the beam interceptor means with respect to the beam projector means.

9. A surveying apparatus for generating energy beams and projecting energy beams therefrom comprising: 'beam source means generating the energy beam;
   a horizontal diverter rotating the energy beam in a horizontal datum plane in a driven position thereof, comprising:
      a rotating table; and
      mirror means supported on the rotating table reflecting the energy beam in a horizontal datum plane;
   a horizontal driver connected to the rotating table driving the rotating table in an activated position thereof rotating the energy beam reflected from the mirror means in a horizontal datum plane;
   prism means supported on the rotating table and rotated in a rotated position of the horizontal diverter, the prism means diverting the energy beam reflected from the mirror means to predetermined angular positions in a vertical datum plane in a driven position of the prism means;
   a vertical driver connected to the prism means driving the prism means in an activated position of the vertical driver positioning the projected energy beam in controlled, predetermined angular positions in a vertical datum plane during the rotation of the energy beam in a horizontal datum plane;
   a projector power supply connected to the horizontal driver and to the vertical driver in one position and activating the horizontal driver and the vertical driver when connected thereto; and
   a beam orientation controller interposed between the horizontal driver, the vertical driver and the projector power supply connecting the projector power supply to the horizontal driver in one position thereof and connecting the projector power supply to the vertical driver in one other position thereof diverting the projected energy beams to predetermined angular positions in a vertical datum plane at predetermined angular positions of the projected energy beam in a horizontal datum plane, thereby controlling the angular position of the projected energy beam in a vertical and a horizontal datum plane.

10. A surveying apparatus comprising: beam projector means for generating energy beams and projecting the energy beams therefrom, comprising:
   a plurality of beam sources, each beam source generating an energy beam having an identifiable wave length;
   a horizontal diverter rotating each of the energy beams in a horizontal datum plane in a driven position thereof;
   a horizontal driver connected to the horizontal diverter driving the horizontal diverter;
   a vertical diverter connected to a portion of the horizontal diverter and rotated in a horizontal datum plane thereby, the vertical diverter diverting each of the projected energy beams at predetermined, distinct angular positions in a vertical datum plane in a driven position of the vertical diverter;
   a vertical driver connected to the vertical diverter driving the vertical diverter positioning each of the energy beams in controlled, predetermined angular positions in a vertical datum plane during the rotation of the energy beams in a horizontal datum plane; and beam receiver means intercepting some of the projected energy beams and identifying the wave length of each intercepted, projected energy beam.

11. A surveying apparatus for intercepting projected energy beams over a predetermined range of angular positions thereof in a vertical datum plane, comprising:

a beam interceptor vertically adjustable to predetermined heights;

more than two vertically spaced detectors, each detector supported on a portion of the beam interceptor, each detector intercepting the projected energy beam at a predetermined position thereof in a vertical and a horizontal datum plane and each detector providing an output signal responsive to the projected energy beam intercepted thereby;

a plurality of beam position indicators, each beam position indicator receiving the output signal of one of the detectors and providing an output indication indicative of the intercepted, projected energy beam;

beam projector means generating and projecting the energy beams, having a portion transmitting a control signal;

a directional antenna connected to the beam interceptor receiving the transmitted control signals from the beam projector means; and a receiver connected to the directional antenna and receiving the transmitted control signals via the directional antenna, the receiver providing an output indication indicative of the received, transmitted control signal, the received, transmitted control signal having a maximum amplitude in an aligned position of the beam projector and the beam interceptor indicating a predetermined aligned position of the beam interceptor and the beam projector.

12. A method for obtaining various surveying parameters utilizing a beam projector for generating and projecting energy beams and a beam receiver for intercepting the projected energy beams, comprising:

rotating the projected energy beam in a horizontal datum plane;

diverting the projected energy beam to predetermined angular positions in a vertical datum plane;

identifying the angular position of the projected energy beam in a horizontal datum plane relative to a known angular direction at predetermined times during the rotation of the projected energy beam in a horizontal datum plane;

intercepting the projected energy beam at one angular position thereof in a horizontal and a vertical datum plane;

detecting the arrival time of the intercepted, projected energy beam; and correlating the detected arrival time of the intercepted projected energy beam with the identified angular positions of the projected energy beam in a horizontal and a vertical datum plane at a time corresponding to the arrival time to determine the angular position of the intercepted, projected energy beam in a vertical and a horizontal datum plane.

13. The method of claim 12 wherein the step of diverting the projected energy beam to predetermined angular positions in a vertical datum plane is defined further to include diverting the projected energy beam a predetermined incremental angular distance in a vertical datum plane after rotating the projected energy beam through a known angular distance in a horizontal datum plane.

14. The method of claim 13 wherein the step of diverting the projected energy beam to predetermined angular positions in a vertical datum plane is defined further to include diverting the projected energy beam repeatedly through a predetermined total angular distance in a vertical datum plane while rotating the projected energy beam in a horizontal datum plane.

15. A method for obtaining various surveying parameters utilizing a beam projector for generating and projecting energy beams and a beam receiver for intercepting the projected energy beams, comprising:

projecting a plurality of energy beams simultaneously, each energy beam having an identifiable wave length;

rotating each of the projected energy beams in a horizontal datum plane;

diverting each of the projected energy beams to predetermined angular positions in a vertical datum plane;

intercepting at least one of the projected energy beams; and detecting the wave length of the intercepted, projected energy beam and identifying the angular position of the intercepted, projected beams in a horizontal and a vertical datum plane.

16. A surveying apparatus comprising:

beam projector means for generating an energy beam and projecting the energy beam therefrom, comprising:

beam source means generating the energy beam;

a horizontal diverter rotating the energy beam in a horizontal datum plane in a driven position thereof;

a vertical diverter diverting the energy beam to predetermined angular positions in a vertical datum plane in a driven position thereof;

a horizontal driver driving the horizontal diverter means in an activated position thereof;

a vertical driver driving the vertical diverter means positioning the energy beam in controlled, predetermined angular positions in a vertical datum plane in an activated position of the vertical driver;

a projector power supply activating the horizontal driver and the vertical driver when connected thereto;

a beam orientation controller interposed between the horizontal driver, the vertical driver and the projector power supply connecting the projector power supply to the horizontal driver in one position thereof for rotating the projected energy beam through a predetermined angular distance in a horizontal datum plane during one period of time and connecting the projector power supply to the vertical driver for diverting the projected energy beam to one predetermined angular position in a vertical datum plane during each period of time the projector energy beam rotates through the predetermined angular distance, the beam orientation controller providing output signals indicative of the angular positions of the projected energy beam in horizontal and vertical datum planes and providing an output control signal indicating the passing of the projected energy beam through a predetermined position in a horizontal datum plane;

transmitter means connected to the beam orientation controller transmitting a control signal in response to each output signal and in response to each received output control signal of the beam orientation controller;

beam receiver means intercepting the projected energy beam in one angular position thereof in a horizontal and a vertical datum plane and providing an output signal responsive to the intercepted, projected energy beam;

receiver means receiving the transmitted control signals from the transmitter means and providing an output signal in response to each received control signal; and means receiving the output signals from the receiver means indicative of the angular positions of the projected energy beam in horizontal and vertical datum planes, a portion receiving the output signal from the receiver means indicating the passing of the projected energy beam through the predetermined position in a horizontal datum plane, and the output signal from the beam receiver means indicating interception of the projected energy beam and providing an output indication indicative of the lapsed time between receiving the two last-mentioned output signals.

17. The surveying apparatus of claim 1 wherein the horizontal driver is defined further as driving the horizontal diverter in an activated position thereof; and wherein the vertical driver is defined further as driving the vertical diverter in an activated position thereof; and wherein the beam projector means is defined further to include:

a projector power supply activating the horizontal driver and the vertical driver when connected thereto; and a beam orientation controller interposed between the horizontal driver, the vertical driver and the projector power supply connecting the projector power supply to the horizontal driver in one position thereof and connecting the projector power supply to the vertical driver in one other position thereof, the beam orientation controller providing an output signal indicative of the angular position of the projected energy beam in a horizontal datum plane and an output signal indicative of the angular position of the projected energy beam in a vertical datum plane; and wherein the means identifying the angular positions of the projected energy beam includes means receiving the output signals indicative of the angular position of the projected energy beam in a horizontal and a vertical datum plane.

18. The surveying apparatus of claim 17 wherein the beam orientation controller connects the projector power supply to the horizontal driver to rotate the projected energy beam through a predetermined angular distance in a horizontal datum plane during one period of time and connects the projector power supply to the vertical driver to divert the projected energy beam to one predetermined angular position in a vertical datum plane during each period of time the projected energy beam rotates through the predetermined angular distance.

19. The surveying apparatus of claim 17 defined further to include:

transmitter means connected to the beam orientation controller transmitting a control signal in response to each output signal of the beam orientation controller; and receiver means receiving the transmitted control signal from the transmitter means and providing an output signal responsive thereto; and wherein the means for identifying the angular position of the projected energy beams includes means receiving the output signal from the receiver means, the means for identifying the angular position of the projected energy beams providing an output signal indicative of the angular position of the intercepted, projected energy beams in a horizontal and a vertical datum plane.

* * * * *